United States Patent
Kranz

(10) Patent No.: US 7,595,618 B2
(45) Date of Patent: Sep. 29, 2009

(54) DC VOLTAGE CONVERTER WITH A DETECTOR CIRCUIT CONFIGURED TO DISTINGUISH BETWEEN OPERATING MODES

(75) Inventor: Christian Kranz, Ratingen Lintorf (DE)

(73) Assignee: Infineon Technologies AG, Neubiberg (DE)

( * ) Notice: Subject to any disclaimer, the term of this patent is extended or adjusted under 35 U.S.C. 154(b) by 220 days.

(21) Appl. No.: 11/168,051

(22) Filed: Jun. 28, 2005

(65) Prior Publication Data

US 2006/0017422 A1    Jan. 26, 2006

(30) Foreign Application Priority Data

Jun. 29, 2004    (DE) .................... 10 2004 031 396

(51) Int. Cl.
*G05F 1/00* (2006.01)
(52) U.S. Cl. .................. 323/282; 323/224; 323/283; 323/284
(58) Field of Classification Search .......... 323/222, 323/224, 271, 283, 284, 285
See application file for complete search history.

(56) References Cited

U.S. PATENT DOCUMENTS

| | | | |
|---|---|---|---|
| 3,531,712 A | | 9/1970 | Cecchini |
| 3,660,753 A | * | 5/1972 | Judd et al. ............. 323/283 |
| 4,571,668 A | * | 2/1986 | Azusawa et al. ........... 363/81 |
| 5,170,333 A | | 12/1992 | Niwayama |
| 5,751,139 A | | 5/1998 | Jordan et al. |
| 6,166,528 A | * | 12/2000 | Rossetti et al. ......... 323/283 |
| 6,232,752 B1 | * | 5/2001 | Bissell ................. 323/225 |
| 6,366,070 B1 | | 4/2002 | Cooke et al. |
| 6,583,602 B2 | * | 6/2003 | Imai et al. ............. 320/118 |
| 6,894,471 B2 | * | 5/2005 | Corva et al. ............ 323/282 |
| 6,900,536 B1 | * | 5/2005 | Derbenwick et al. ...... 257/724 |
| 6,906,536 B2 | | 6/2005 | Pearce et al. |
| 2004/0119447 A1 | * | 6/2004 | Kato .................... 323/222 |
| 2004/0119944 A1 | | 6/2004 | Hosoi |

FOREIGN PATENT DOCUMENTS

DE    41 36 809 A1    5/1992
DE    103 34 598 A1    2/2005

OTHER PUBLICATIONS

Abstract from the book entitled "Halbleiter-Schaltungstechnik" by U. Tietze and Ch. Schenk, Chapter 16.6.3, 4 pgs.
U.S. Appl. No. 11/168,153, filed Jun. 28, 2005, Leyk et al., Entire Document.

* cited by examiner

*Primary Examiner*—Akm E Ullah
*Assistant Examiner*—Arun Williams
(74) *Attorney, Agent, or Firm*—Lee & Hayes, PLLC

(57) ABSTRACT

A DC voltage converter is provided that cyclically converts an input-side supply voltage into an output voltage, and includes an inductive storage element connected between a supply voltage terminal and, in a manner such that it is coupled via a first switch, a reference potential terminal. The capacitively buffered terminal for the output voltage is connected, via a second switch, between the inductive storage element and the first switch. Provision is furthermore made of a detector circuit, which distinguishes between a first and a second operating mode of the DC voltage converter and has a detector voltage tapped off between the inductive storage element and the first switch applied thereto. The detector circuit provides an output signal that is used to distinguish between the first and second operating modes of the DC voltage converter.

19 Claims, 4 Drawing Sheets

DC VOLTAGE CONVERTER WITH A DETECTOR CIRCUIT CONFIGURED TO DISTINGUISH BETWEEN OPERATING MODES

REFERENCE TO RELATED APPLICATIONS

This application claims the benefit of the priority date of German application DE 10 2004 031 396.2, filed on Jun. 29, 2004, the contents of which are herein incorporated by reference in its entirety.

FIELD OF THE INVENTION

The present invention relates to a DC voltage converter, which is operated cyclically and has a detector circuit configured to distinguish between a first and a second operating mode of the DC voltage converter.

BACKGROUND OF THE INVENTION

DC voltage converters are used in portable devices in which the batteries provide only a low supply voltage on account of the desired miniaturization and weight saving. In order to supply the circuit units of the devices, a DC voltage converter converts the supply voltage into a higher output voltage. The design of such a DC voltage converter (which is also referred to as a step-up converter) is described in Tietze/Schenk: "Halbleiterschaltungstechnik" [Semiconductor circuit technology], 12th edition, pages 948 to 949.

A DC voltage converter comprises an inductive storage element, which is connected between a supply voltage terminal and, in such a manner that it is coupled via a first switch, a reference potential terminal. The capacitively buffered terminal for the output voltage is connected, via a second switch, between the inductive storage element and the first switch.

During ideal cyclic operation, the first switch and the second switch change over simultaneously. If the first switch is on and the second switch is off, energy is stored in the inductive storage element. The charge is removed if the second switch is on and the first switch is off, and the capacitor is charged. If the switching states of the first and second switches remain unchanged, the coil current that drains from the inductive storage element falls continuously until the inductive storage element has been discharged and no more coil current flows. This operating mode is also referred to as intermittent operation. If the first switch and the second switch are changed over before the coil current has ceased, this operating mode is referred to as continuous operation.

So that the output voltage assumes a prescribed value, provision is made of a regulating circuit, which is coupled, on the output side, to the control inputs of the first and second switches and regulates the switching states of the latter. The regulating circuit is configured in such a manner that it operates in one of two operating modes depending on whether the DC voltage converter is operating intermittently or continuously.

Use has been made of DC voltage converters which operate either intermittently or continuously, with the result that the regulating circuit is designed for only one operating mode.

In the case of regulating circuits which can be changed over between the two operating modes, the operating mode of the DC voltage converter must be determined so that the regulating circuit operates in the corresponding operating mode. In some instances the coil current has been measured in order to distinguish between the two operating modes of the DC voltage converter. This is associated with a considerable outlay in circuitry.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

FIG. 5 illustrates the design of the DC voltage converter of FIG. 1 wherein the second switch comprises a diode 10, having a first terminal 101 and a second terminal 102. This has the advantage that the regulating circuit need provide only a first switching signal, thus correspondingly simplifying the regulating circuit and the associated regulation.

The invention is directed to a detector circuit, which can be implemented in a simple manner and-is configured to distinguish between a first and a second operating mode of the DC voltage converter.

The invention is employed in conjunction with a DC voltage converter, which cyclically converts an input-side supply voltage into an output voltage. The converter comprises an inductive storage element having a first terminal and a second terminal, wherein the first terminal is connected to a supply voltage terminal.

The converter also comprises a first switch having a first terminal and a second terminal, and is connected in series with the inductive storage element, wherein the first terminal of the first switch is connected to the second terminal of the inductive storage element, and the second terminal of the first switch is connected to a reference potential terminal.

In addition, the converter includes a second switch having a first terminal and a second terminal, wherein the first terminal is connected to the second terminal of the inductive storage element and wherein the second terminal operates as an output voltage terminal at which the output voltage is provided.

Further, the converter includes a capacitive storage element which is connected between the output voltage terminal and the reference potential terminal, and a detector circuit configured to distinguish between a first operating mode and a second operating mode. The detector circuit is configured to receive a detector voltage tapped off at the second terminal of the inductive storage element, and provides an output signal that is used to distinguish between the first operating mode and the second operating mode of the DC voltage converter.

In one embodiment, the detector circuit comprises a threshold value decision unit, to which the detector voltage is applied on the input side, and a downstream storage element whose output signal indicates the operating mode. This exemplary arrangement comprising only two standard components can be integrated in a simple manner.

On the output side, a regulating circuit provides a first switching signal for cyclically switching the first switch and a second switching signal for cyclically switching the second switch. This means that the prescribed output voltage is provided even when the load is changed.

The first switching signal and the second switching signal are selected in such a manner, or are substantially selected in such a manner, that the first switch and the second switch are on in a push-pull mode or are off in the push-pull mode. This switching behavior advantageously ensures that the DC voltage converter has a high level of efficiency.

In one embodiment, either the first switch comprises an n-channel field effect transistor and the second switch comprises a p-channel field effect transistor, or the first switch comprises a p-channel field effect transistor and the second switch comprises an n-channel field effect transistor. In this embodiment, the first and second switches can be driven using the same switching signal.

In an alternative embodiment, both the first switch and the second switch comprise an n-channel field effect transistor or the first switch and the second switch comprise a p-channel field effect transistor, with the result that only one type of switch is used.

In another alternative embodiment, the second switch comprises a diode. This has the advantage that the regulating circuit need provide only a first switching signal, thus correspondingly simplifying the regulating circuit and the associated regulation.

Intermittent and continuous operation of the DC voltage converter can also be distinguished using the switching state of the first and second switches. During continuous operation, if the coil current does not disappear, it is ensured that the first switch and the second switch are not off at the same time. Interrupting the coil current would otherwise lead to voltage oscillations that may negatively impact the circuit. Configuring the second switch in the form of a diode ensures that the second switch is always on if the coil current does not tend toward zero. The bulk diode assumes the same function if the second switch comprises a field effect transistor. In this case, the switch is configured to have an additional diode function such that, if a relatively large current is flowing, the switch is not switched from on to off.

During intermittent operation, the diode turns off if the coil current tends toward zero. In this case, residual energy is still stored in the inductive storage element. Since, in this case, the first and second switches are off, voltage oscillations of the detector voltage result on account of the resonant circuit formed from the inductive storage element and the parasitic switch capacitance. Intermittent operation is distinguished from continuous operation by detecting this voltage oscillation.

When the second switch comprises a field effect transistor, these voltage oscillations do not occur if the switch is on and the coil current tends toward zero. It is therefore advantageous, when changing from intermittent to continuous operation, to switch the field effect transistor (as an embodiment of the second switch), shortly before the inductive storage element is recharged, in such a manner that the transistor is intended to turn off. If the coil current tends toward zero, the characteristic voltage oscillations occur. In the event of a relatively large coil current, the bulk diode ensures that the coil current can flow in spite of the switching signal.

Consequently, a first operating mode is defined by virtue of the fact that a first period of time, in which the first switch is off, overlaps a second period of time, in which the second switch is off. In contrast, the first and second periods of time do not overlap in the second operating mode. This definition makes it possible to distinguish between the two operating modes using the occurrence of the oscillations of the detector voltage, wherein the oscillations only occur if the first and second periods of time overlap. The first operating mode corresponds to intermittent operation and the second operating mode corresponds to continuous operation.

In one embodiment the threshold value decision unit assigns one of two logic states to an output-side signal in such a manner that a first logic state is assumed if an internal threshold value is exceeded and a second logic state is assumed otherwise.

In an alternative embodiment, the threshold value decision unit is configured in such a manner that one or two logic states are assigned to an output-side signal, wherein the first logic state is assumed if an internal threshold value is undershot and the second logic state is assumed otherwise.

In one advantageous embodiment of the threshold value decision unit, the latter has two internal threshold values, a first threshold value for changing over from the first to the second state being distinguished, by switching hysteresis, from a second threshold value for changing over from the second to the first state. This development, which may be referred to as a Schmitt trigger in some instances, can be implemented in a simple manner.

The storage element is provided with a set input, which is coupled to the output of the threshold value decision unit, a reset input and an output, wherein the reset input is coupled to the first switching signal in such a manner that one of the logic states is applied to the storage element on the output side if the first switch is on and another logic state is applied on the output side as soon as a clock edge appears at the set input if the first switch is off. This embodiment detects overshoots and undershoots of the detector voltage early when they first occur. The storage element advantageously comprises a D-type flip-flop.

The threshold value decision unit may be provided with a supply input. The storage element may be configured such that it has a further input, which, for example in the case of the D-type flip-flop, is used to assign a value to one of the logic states.

The output signal of the detector circuit in one example is expediently coupled to the regulating circuit in such a manner that the latter operates in the first operating mode if the signal at the output of the storage element cyclically alternates between two states and operates in the second operating mode if the signal at the output of the storage element is constant.

In one advantageous embodiment, the DC voltage converter is designed using integrated circuit technology, thus supporting the desired miniaturization in the devices used.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention is explained below using exemplary embodiments and state diagrams and with reference to the drawing, in which.

DETAILED DESCRIPTION OF THE DRAWINGS

Figure 1:
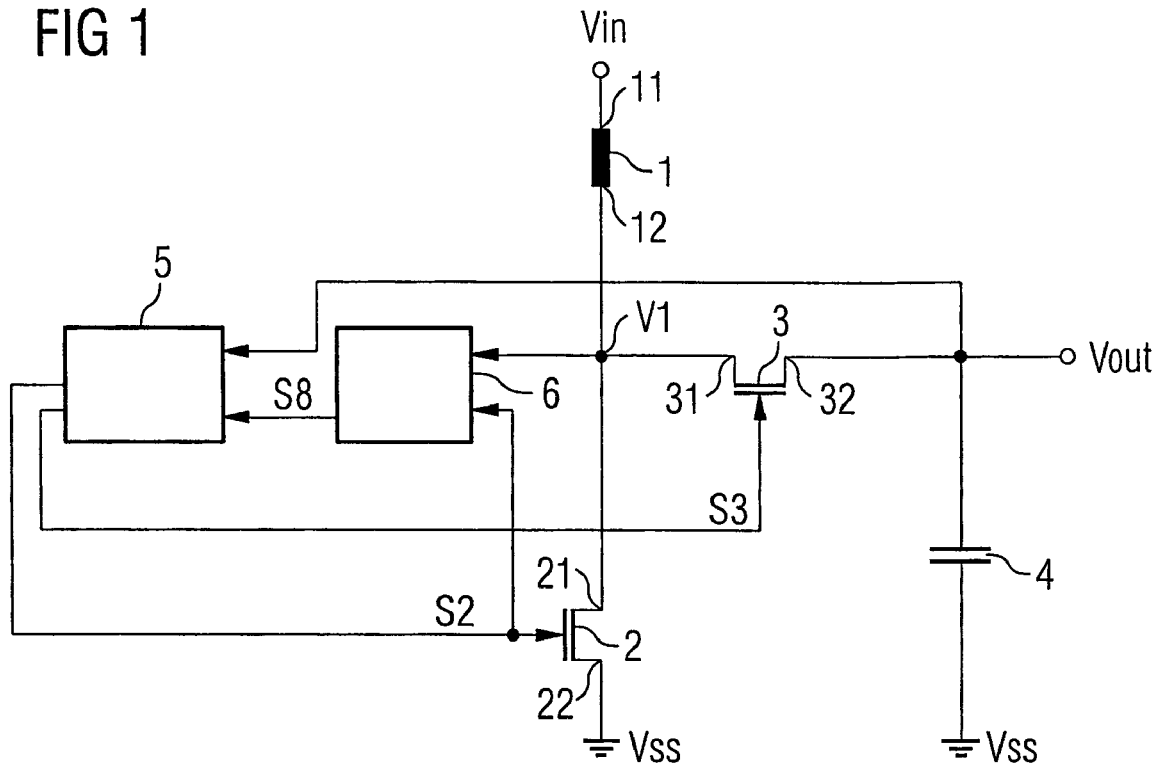
FIG. 1 is a schematic diagram illustrating one exemplary embodiment of a DC voltage converter.

FIG. 1 illustrates a DC voltage converter, which cyclically converts an input-side supply voltage Vin into an output voltage Vout. The DC voltage converter comprises an inductive storage element 1 having a first terminal 11 and a second terminal 12, the first terminal 11 of which is connected to a supply voltage terminal Vin. In addition, the DC voltage converter comprises a first switch 2, which has a first terminal 21 and a second terminal 22, and is connected in series with the inductive storage element 1, the first terminal 21 of the first switch 2 being connected to the second terminal 12 of the inductive storage element 1 and the second terminal 22 of the first switch 2 being connected to a reference potential terminal Vss. A second switch 3 having a first terminal 31 and a second terminal 32 is connected, by way of the first terminal 31, to the second terminal 12 of the inductive storage element 1. The output voltage terminal containing the output voltage Vout is provided at the second terminal 32 of the second switch 3. A capacitive storage element 4 is connected between the output for providing the output terminal and the reference potential terminal.

On the output side, a regulating circuit 5 provides a first switching signal S2 for controlling the first switch 2 and a second switching signal S3 for controlling the second switch 3 so that the output voltage Vout assumes a prescribed value. The regulating circuit 5 is configured in such a manner that it can be changed over between a first and a second operating mode. Applied on the input side of the regulating circuit 5 are the output voltage Vout and the output signal S8 of an upstream detector circuit, which is intended to distinguish between a first and a second operating mode of the DC voltage converter and to which a detector voltage V1 (which is tapped off at the second terminal 12 of the inductive storage element 1) and the first switching signal S2 are applied on the input side. The detector circuit 6 and the regulating circuit 5 are coupled in such a manner that, when a first operating mode is detected by the detector circuit 6, the regulating circuit 5 operates in the first operating mode and, when a second operating mode is detected, the regulating circuit 5 operates in the second operating mode.

Figure 2:
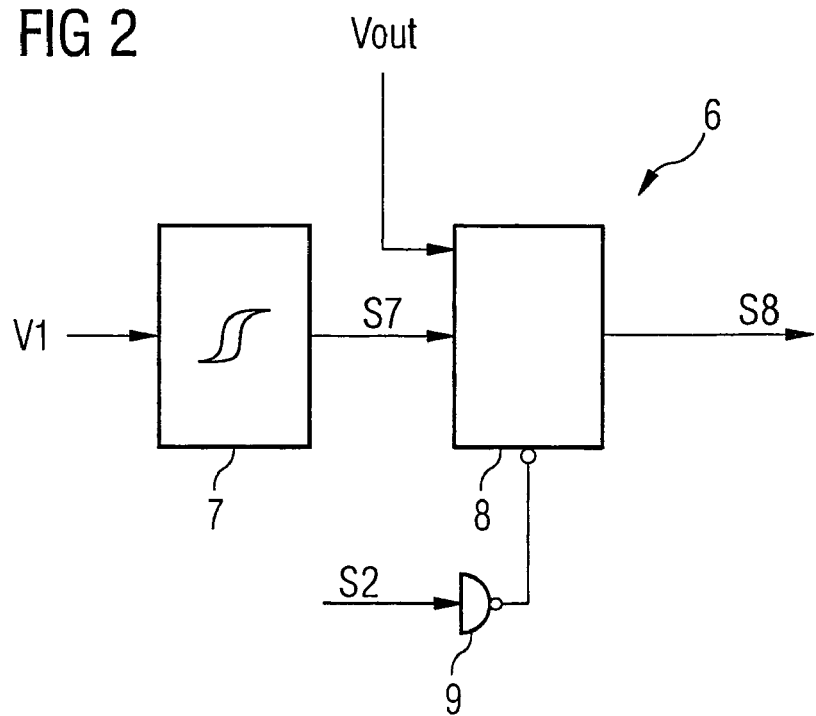
FIG. 2 is a schematic diagram illustrating one exemplary embodiment of a detector circuit.

FIG. 2 illustrates the design of the detector circuit 6. The detector circuit 6 essentially comprises a 20 threshold value decision unit 7 with a downstream storage element 8. The detector voltage V1 is applied to the threshold value decision unit 7 on the input side.

The threshold value decision unit 7 assigns one of two logic states to an output-side signal S7 in such a manner that the first logic state is assumed if an internal threshold value is undershot and the second logic state is otherwise assumed. The threshold value may be set to detect overshoots or undershoots.

An alternative embodiment of the threshold value decision unit 7, which is also referred to as a Schmitt trigger, has two internal threshold values, a first threshold value for changing over from the first to the second state being distinguished, by switching hysteresis, from a second threshold value for changing over from the second to the first state.

The storage element 8 has a set input, which is coupled to the output of the threshold value decision unit 7, and a reset input, the reset input being coupled to the first switching signal S2 in such a manner that one logic state is applied to the output of the storage element 8 if the first switch 2 is on and another logic state is applied on the output side as soon as a clock edge appears at the set input if the first switch 2 is off.

One advantageous design of the storage element 8 is a D-type flip-flop whose initial state is reset if no voltage is applied to the reset input, as illustrated by way of example in FIG. 1. This design allows the circuit to be started up in a stable manner. The storage element may be configured such that it has a further input, which, for example in the case of the D-type flip-flop, is used to assign a value to one of the logic states. This input is connected to the output voltage Vout.

As shown in FIG. 2, an inverter 9 is provided for the purpose of coupling the storage element 8 to the first switching signal S2. The inverter may also be in the form of a fast-switching driver inverter. Alternatively, it is also possible, for example, to couple directly or via an amplifier. Since, for example, the threshold value decision unit 7 may be designed to be inverting, the first logic state at the output of the threshold value decision unit 7 may correspond to a different value than the first logic state at the output of the storage element 8.

Figure 3:
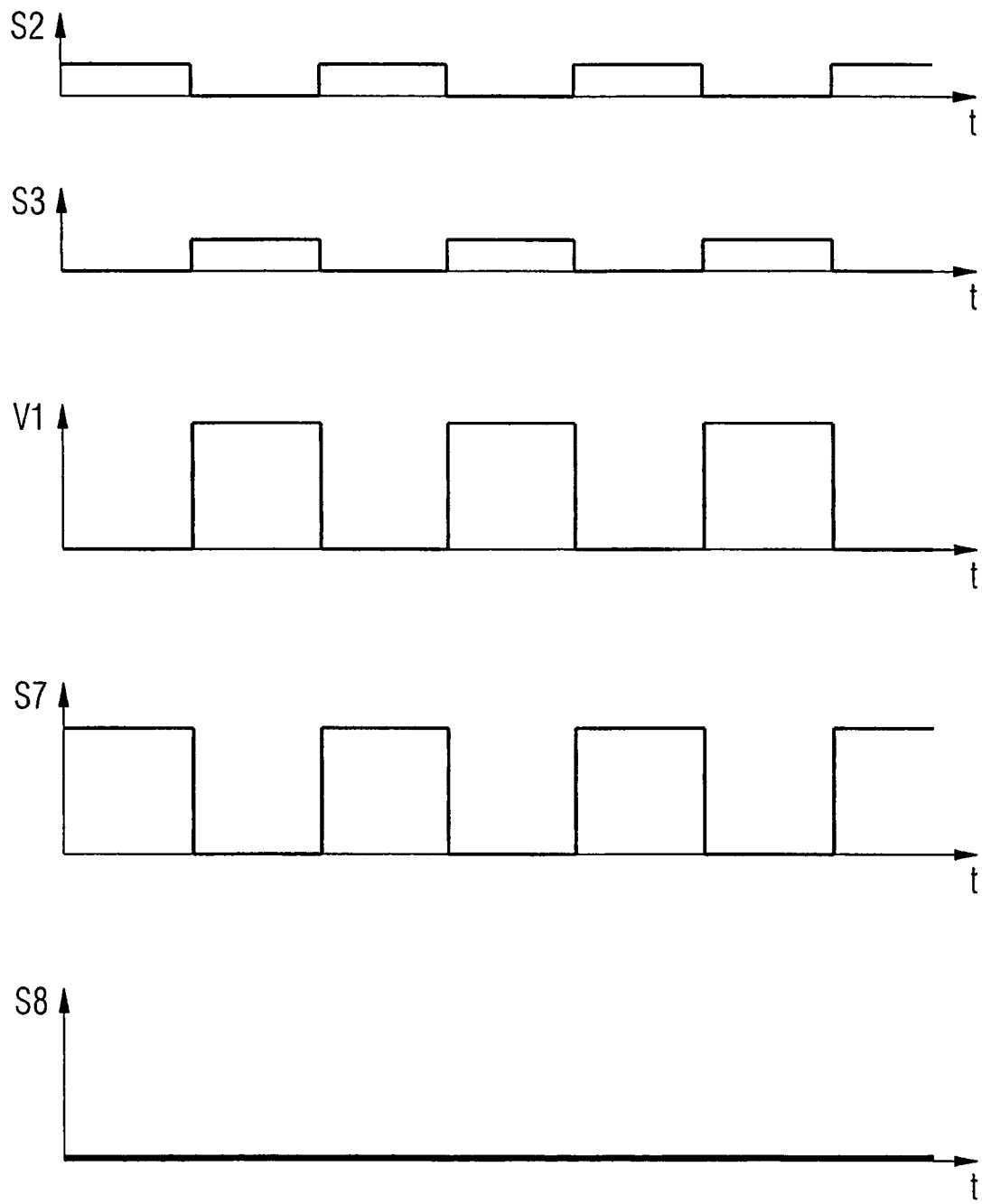
FIG. 3 is a timing diagram illustrating selected time signals to show a state diagram in a second operating mode of the DC voltage converter of FIG. 1 according to the invention.

FIG. 3 uses selected time signals to illustrate the state diagram for a second operating mode of the DC voltage converter. The first switching signal S2 and the second switching signal S3 are coupled to the first switch 2 and the second switch 3, respectively, in such a manner that the switches are on in the case of a high level and are off in the case of a low level. The detector voltage V1, the output signal S7 of the threshold value decision unit 7 and the output signal S8 of the storage element 8 are furthermore illustrated.

The method of operation of the detector circuit 6 is first of all explained below for the second operating mode of the DC voltage converter. In the second operating mode, a first period of time, in which the first switch 2 is off, does not overlap a second period of time, in which the second switch 3 is off.

FIG. 3 illustrates that, initially, the switch 2 is on and the second switch 3 is off, with the result that the inductive storage element 1 is charged with energy. In this case, the detector voltage V1 is at the potential of the reference voltage Vss.

In this exemplary embodiment, the threshold value decision unit 7 is configured in such a manner that its output is inverting and the internal threshold is set to detect undershoots. The output signal S7 of the threshold value decision unit 7 has the value of the first state of the threshold value decision unit output. Since the first switch 2 is on, a first state of the storage element output is applied to the output of the storage element 8.

If the first switch 2 and the second switch 3 are changed over, the first switch 2 is off and the second switch 3 is on. The inductive storage element 1 is discharged via a coil current that becomes continuously smaller. The detector voltage V1 has approximately the value of the output voltage Vout. The second state of the threshold value decision unit 7 is applied to the output of the latter since the internal threshold has been exceeded by the detector voltage V1. Since no clock edge appears at the set input of the storage element 8 if the first switch 2 is off, the state at the output of the storage element 8 remains unchanged.

Figure 4:
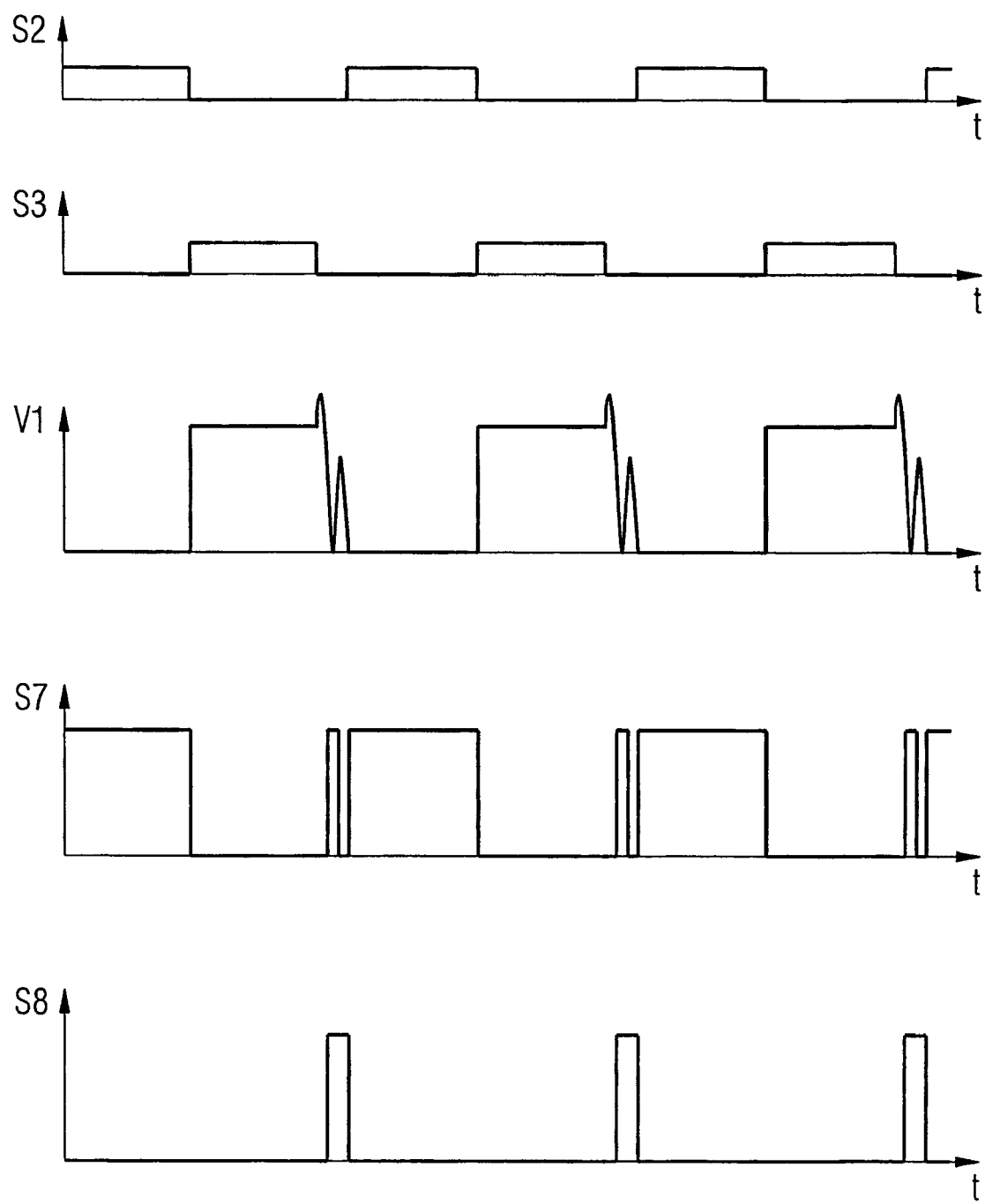
FIG. 4 is a timing diagram illustrating selected time signals to show a state diagram in a first operating mode of the DC voltage converter of FIG. 1 according to the invention.
Figure 5:
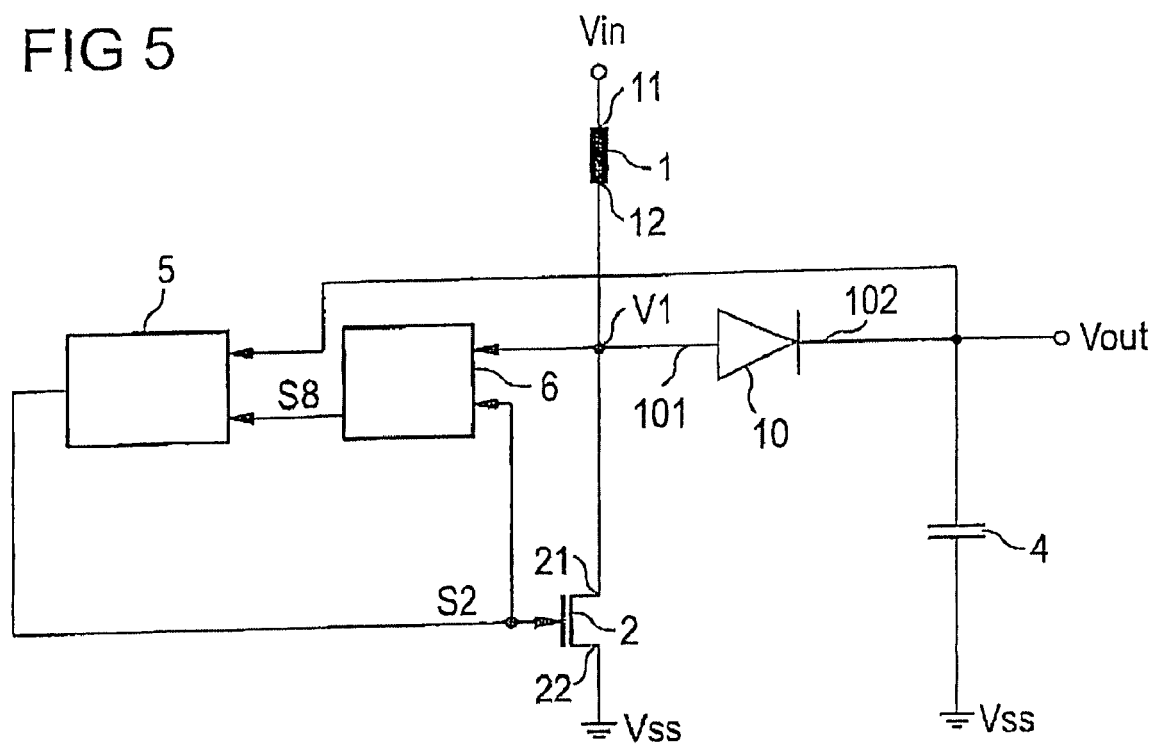
FIG. 5 is a schematic diagram illustrating one exemplary embodiment of a DC voltage converter.

FIG. 4 uses selected time signals to illustrate the state diagram for a first operating mode of the DC voltage converter. The coupling of the first switching signal S2 to the first switch 2 and of the second switching signal S3 to the second switch 3 is unchanged.

The first switching signal S2 and the second switching signal S3 differ from those in FIG. 3 by virtue of the fact that an additional phase, which is characteristic of the first operating mode and in which the first switch 2 and the second switch 3 are off, occurs. This phase occurs toward the end of the operation of discharging the inductive storage element 1. Since residual energy is still stored in the inductive storage element, interrupting the flow of coil current results in oscillations of the detector voltage V1 which are caused by the resultant resonant circuit formed from the inductive storage element 1 and the parasitic switch capacitance.

If the undershoot of the detector voltage V1 undershoots the internal threshold of the threshold value decision unit 7, the output signal S7 changes from the second to the first state. The storage element 8 detects a signal edge of the input-side signal S7 if the first switch 2 is off. Consequently, the output signal S8 of the storage element 8 changes to another state. The output-side state of the storage element 8 is only switched back again when the first switch 2 is on. The output signal S8 of the storage element 8 therefore cyclically alternates between two states.

The output signal S8 of the storage element 8, which is coupled to the regulating circuit, is used to distinguish between the first and second operating modes, and the regulating circuit is switched to the corresponding operating mode.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A DC voltage converter, which cyclically converts an input-side supply voltage into an output voltage, comprising:
    an inductive storage element comprising a first terminal and a second terminal, wherein the first terminal is coupled to a supply voltage terminal;
    a first switch comprising a first terminal and a second terminal, and coupled in series with the inductive storage element, wherein the first terminal of the first switch is coupled to the second terminal of the inductive storage element, and the second terminal of the first switch is coupled to a reference potential terminal;
    a second switch comprising a first terminal and a second terminal, wherein the first terminal is coupled to the second terminal of the inductive storage element, and the second terminal is coupled to an output voltage terminal;
    a capacitive storage element coupled between the output voltage terminal and the reference potential terminal; and
    a detector circuit configured to distinguish between an intermittent operating mode of the DC voltage converter and a continuous operating mode of the DC voltage converter, the detector circuit configured to receive a detector voltage tapped off at the second terminal of the inductive storage element wherein the detector circuit comprises a threshold value decision unit configured to receive the detector voltage and a downstream storage element coupled to the threshold value decision unit, the detector circuit configured to generate the output signal to distinguish between the intermittent operating mode and the continuous operating mode of the DC voltage converter.

2. The DC voltage converter of claim 1, wherein the first switch is configured to switch cyclically in a manner dependent on a first switching signal and the second switch is configured to switch cyclically in a manner dependent on a second switching signal.

3. The DC voltage converter of claim 2, further comprising a regulating circuit configured to receive the output voltage and generate the first switching signal and the second switching signal in response thereto to force the output voltage to a prescribed level.

4. The DC voltage converter of claim 3, wherein the regulating circuit is configured to switch between the intermittent operating mode and the continuous operating mode, wherein the regulating circuit is coupled to the output signal of the detector circuit such that, when a intermittent operating mode of the DC voltage converter is detected, the regulating circuit generates the first and second switching signals in the intermittent operating mode and, when a continuous operating mode of the DC voltage converter is detected, the regulating circuit generates the first and second switching signals in the continuous operating mode.

5. The DC voltage converter of claim 3, wherein the regulating circuit is further configured to generate the first switching signal and the second switching signal such that the first switch and the second switch are on in a push-pull mode or are off in the push-pull mode.

6. The DC voltage converter of claim 5, wherein either the first switch comprises an n-channel field effect transistor and the second switch comprises a p-channel field effect transistor, or the first switch comprises a P-channel field effect transistor and the second switch comprises an n-channel field effect transistor, and the first switching signal and the second switching signal are in phase or are substantially in phase.

7. The DC voltage converter of claim 5, wherein both the first switch and the second switch comprise n-channel field effect transistors or p-channel field effect transistors, and the first switching signal and the second switching signal are in antiphase or are substantially in antiphase.

8. The DC voltage convener of claim 1, wherein the second switch comprises a diode having an anode coupled to the second terminal of the inductive storage element and a cathode coupled to the output voltage terminal.

9. The DC voltage converter of claim 3, wherein the regulating circuit is configured such that only the first switching signal configured to cyclically switch the first switch is generated.

10. The DC voltage convener of claim 4, wherein the regulating circuit is further configured to generate the first and second switching signals such that during a first period of time, in which the first switch is off, and a second period of time, in which the second switch is off, overlap in the first operating mode of the DC voltage converter and the first and second periods of time do not overlap in the second operating mode.

11. The DC voltage converter of claim 1, wherein the threshold value decision unit is configured to assign one of two logic states to an output-side signal, wherein a first logic state is assumed if an internal threshold value for detecting overshoots is exceeded, and wherein a second logic state is assumed otherwise.

12. The DC voltage converter of claims 11, wherein the downstream storage element comprises a set input coupled to the output of the threshold value decision unit, a reset input and an output, wherein the reset input is coupled to the first switching signal such that one of the logic states is applied to the storage element on the output side if the first switch is on and another logic state is applied on the output side as soon as a clock edge appears at the set input if the first switch is off.

13. The DC voltage convener of claim 12, wherein the downstream storage element comprises a D-type flip-flop and has a further input in order to assign a value to one of the logic states, this input, for its part, being connected to the terminal for the output voltage.

14. The DC voltage converter of claim 13, further comprising an inverter connected upstream of the reset input of the storage element, and configured to reset the storage clement if the first switch is on.

15. The DC voltage converter of claim 1, wherein the threshold value decision unit is configured to assign one of the two logic states to an output-side signal, the first logic state being assumed if an internal threshold value for detecting undershoots is undershot and the second logic state assumed otherwise.

16. The DC voltage converter of claim 15, wherein the threshold value decision unit has two internal threshold values, wherein a first threshold value for changing over from the first to the second state is distinguished, by switching hysteresis, from a second threshold value for changing over from the second to the first state.

17. The DC voltage converter of claim 1, wherein the threshold value decision unit and the downstream storage element each comprise a supply terminal connected to the output voltage terminal.

18. The DC voltage converter of claim 3, wherein the output signal of the detector circuit is coupled to the regulating circuit such that the regulating circuit is configured in the intermittent operating mode if the signal at the output of the downstream storage element alternates cyclically between two states, and operates in the continuous operating mode if the signal at the output of the downstream storage element is constant.

19. A DC voltage converter circuit, comprising:
   an inductance coupled between a supply potential and a feedback node;
   a capacitance coupled between an output terminal and a reference potential;
   a first switch coupled between the feedback node and the reference potential;
   a second switch coupled between the feedback node and the output terminal;
   a detector circuit configured to detect operating modes of the converter circuit, one operating mode being characterized by the converter circuit operating continuously and another operating mode of the converter circuit being characterized by the converter circuit operating intermittently, the detector circuit configured to detect the operating modes of the converter circuit based on a voltage condition at the feedback node; and
   a regulating circuit configured to generate first and second switching signals associated with the first and second switches, respectively, based on the detected continuous operating mode and intermittent operating mode of the convener circuit.

* * * * *